United States Patent
Trivedi et al.

(10) Patent No.: US 12,414,001 B2
(45) Date of Patent: Sep. 9, 2025

(54) METHOD AND APPARATUS FOR NETWORK TRAFFIC MANAGEMENT

(71) Applicant: Samsung Electronics Co., Ltd., Suwon-si (KR)

(72) Inventors: Uday Trivedi, Bangalore (IN); Raviraj Bhat, Bangalore (IN); Ajith Kumar Kuppan, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 18/417,892

(22) Filed: Jan. 19, 2024

(65) Prior Publication Data
US 2024/0357410 A1 Oct. 24, 2024

Related U.S. Application Data

(63) Continuation of application No. PCT/KR2023/022007, filed on Dec. 29, 2023.

(30) Foreign Application Priority Data

Apr. 18, 2023 (IN) .............................. 202341028351
Sep. 28, 2023 (IN) .............................. 202341028351

(51) Int. Cl.
*H04W 28/02* (2009.01)
*H04L 9/40* (2022.01)
(Continued)

(52) U.S. Cl.
CPC ......... *H04W 28/0215* (2013.01); *H04L 41/16* (2013.01); *H04L 47/2483* (2013.01); *H04L 63/0428* (2013.01)

(58) Field of Classification Search
CPC .. H04L 41/16; H04L 47/2483; H04L 63/0428
See application file for complete search history.

(56) References Cited

U.S. PATENT DOCUMENTS 9,930,057 B2  3/2018  Di Pietro
11,894,994 B2  2/2024  Newell
(Continued)

FOREIGN PATENT DOCUMENTS

CN   101841440   1/2012
CN   111917694   11/2020
(Continued)

OTHER PUBLICATIONS

Search Report and Written Opinion dated Apr. 17, 2024 issued in International Patent Application No. PCT/KR2023/022007.
(Continued)

*Primary Examiner* — Hieu T Hoang
(74) *Attorney, Agent, or Firm* — Nixon & Vanderhye, P.C.

(57) ABSTRACT

The present disclosure relates to field of telecommunication network and discloses method and apparatus e.g., network entity for network traffic management. The network entity may be associated with a Deep Packet Inspection System (DPI), the network entity receives an encrypted Quick User Datagram Protocol (UDP) Internet Connection (QUIC) data packet flow from a source. Further, network entity predicts using an Artificial Intelligence (AI) model, a relevancy of decryption for an encrypted QUIC initial handshake packet of the QUIC data packet flow based on at least one of pre-stored User Equipment (UE) context parameters, pre-stored server context parameters and flow context parameters of the encrypted QUIC data packet flow. The network entity decrypts the encrypted QUIC initial handshake packet based on the relevancy of the decryption being predicted to be useful. The present disclosure helps to optimize Deep Packet Inspection (DPI) operation.

20 Claims, 7 Drawing Sheets

(51) Int. Cl.
  *H04L 41/16* (2022.01)
  *H04L 47/2483* (2022.01)

(56) References Cited

U.S. PATENT DOCUMENTS

| | | | |
|---|---|---|---|
| 2018/0062950 A1 | 3/2018 | Baldi et al. | |
| 2020/0067954 A1* | 2/2020 | Plonka | H04L 63/166 |
| 2020/0274815 A1* | 8/2020 | Sreevalsan | H04L 47/2441 |
| 2020/0287888 A1* | 9/2020 | Moore | H04L 63/0884 |
| 2021/0021641 A1* | 1/2021 | Anderson | G06F 18/24155 |
| 2021/0044572 A1* | 2/2021 | Liu | H04L 63/0428 |
| 2021/0204152 A1* | 7/2021 | Vasudevan | G06N 3/0475 |
| 2021/0266310 A1 | 8/2021 | Moore et al. | |
| 2022/0078208 A1* | 3/2022 | Anderson | G06N 7/01 |
| 2022/0150143 A1* | 5/2022 | Liu | H04L 43/0888 |
| 2023/0328514 A1* | 10/2023 | Muñoz De La Torre Alonso | H04W 12/0431 380/27 |
| 2024/0380727 A1* | 11/2024 | Gomez-Hidalgo Perez | H04W 8/26 |

FOREIGN PATENT DOCUMENTS

| | | |
|---|---|---|
| CN | 110311829 | 3/2021 |
| CN | 113518042 A | 10/2021 |
| CN | 114679314 A | 6/2022 |
| WO | 2022/026466 | 2/2022 |
| WO | 2022/058038 | 3/2022 |

OTHER PUBLICATIONS

Saha et al., "Predicting Potentially Undetectable Flows in DPI System using Machine Learning", IEEE, 2021, 6 pages.

* cited by examiner

METHOD AND APPARATUS FOR NETWORK TRAFFIC MANAGEMENT

CROSS-REFERENCE TO RELATED APPLICATIONS

This application is a continuation of International Application No. PCT/KR2023/022007 designating the United States, filed on Dec. 29, 2023, in the Korean Intellectual Property Receiving Office and claiming priority to Indian Provisional Patent Application No. 202341028351, filed on Apr. 18, 2023, in the Indian Patent Office, and to Indian Complete patent application No. 202341028351, filed on Sep. 28, 2023, in the Indian Patent Office, the disclosures of each of which are incorporated by reference herein in their entireties.

BACKGROUND

Field

The disclosure relates to field of telecommunication networks. For example, the present disclosure relates to a method and apparatus for network traffic management.

Description of Related Art

Deep Packet Inspection (DPI) may refer to a network packet inspection system in real-time (Shown in FIG. 1). A DPI system examines packet payloads to identify traffic flow as specific application flow. In other words, the DPI system manages network traffic by prioritizing the packet payloads by identifying it as specific application flow. A typical DPI system uses multiple processing engines with each processing engine inspecting packet or flow related characteristics. As an example, the engines may include pattern-matching engine, Internet Protocol (IP) and port-matching engine, behavior-based detection etc. DPI is generally used by telecom operators for traffic detection, for applying differential charging and Quality of Service (QOS) policy, for resource management in core network etc. Existing DPI systems support detection of limited set of applications and cannot support all application traffic. Also, in the existing DPI system around 20-30% traffic goes undetected and remaining traffic is marked as either application specific or generic (Hypertext Transfer Protocol (HTTP)/Hypertext Transfer Protocol Secure (HTTPS)/Quick User Datagram Protocol (UDP) Internet Connection (QUIC)).

In the recent times, several applications and web services especially in the field of video streaming have adopted to Internet Engineering Task Force (IETF) QUIC protocol instead of Transmission Control Protocol (TCP). HTTP version 3 which is next major version in HTTP is also based on QUIC. For applications using QUIC protocol, Server Name Indicator (SNI) field is used for application detection by DPI solutions. IETF QUIC standard mandates encryption of payload including pseudo encryption of initial QUIC handshake packets (Transport Layer Security (TLS) handshake). Hence packet decryption (IETF QUIC 1.0 uses Advanced Encryption Standard (AES)) is needed for extracting the SNI from the Client Hello packet or an initial handshake packet of QUIC handshake. Therefore, performing DPI on the encrypted QUIC streams is challenging and more CPU consuming due to complexities involved in decryption and parsing of QUIC client hello packets. This additional processing significantly degrades overall DPI system throughput (QUIC packet per second handling rate). Moreover, with higher percentage of QUIC Flows with encrypted SNI, decryption task requires high processing and may limit throughput of DPI/Firewall systems.

In the existing DPI systems every QUIC data packet flow is decrypted to check if SNI obtained post decryption matches with any signatures pre-stored in the DPI system, in order to perform application detection e.g., to detect the QUIC data packet flows that belong to a specific application. As there could be multiple QUIC data flows that are not related to the specific application to be detected, decrypting all such QUIC data packet flows leads to unnecessary decryption overhead for the CPU and consumes substantive CPU resources. Generally, QUIC decryption and payload parsing may take up more than 50% of total CPU cycles which can substantially impact the throughput of DPI/firewall systems. Additionally, Central Processing Unit (CPU) consumption is substantially high due to complexities involved in decryption and parsing each QUIC data packet flow. This affects overall DPI performance (packet per second handling rate) and leads to delays in overall network traffic management.

Some of the existing techniques, mark all QUIC flows as detectable, and perform DPI on all the QUIC flows, which consumes substantial CPU resources and impacts throughput of the DPI system. Therefore, in the existing DPI systems, there is no way of reducing the decrypting overhead. Therefore, there is a need to optimize QUIC flow processing that can effectively reduce decrypting overhead, unnecessary CPU consumption, and complexity associated with performing DPI.

The information disclosed in this background of the disclosure section is only for enhancement of understanding of the general background of the disclosure and should not be taken as an acknowledgement or any form of suggestion that this information forms the prior art already known to one skilled in the art.

SUMMARY

According to various example embodiments, a method of network traffic management is provided. The method comprises receiving, by a network entity, an encrypted Quick User Datagram Protocol (UDP) Internet Connection (QUIC) data packet flow from a source. The method comprises predicting using an Artificial Intelligence (AI) model a relevancy of decryption for an encrypted QUIC initial handshake packet of the QUIC data packet flow based on at least one of pre-stored User Equipment (UE) context parameters, pre-stored server context parameters and flow context parameters of the encrypted QUIC data packet flow. The method comprises decrypting the encrypted QUIC initial handshake packet based on the relevancy of the decryption being predicted to be useful.

According to various example embodiments, a network entity for assessing performance of network traffic management is provided. The network entity comprises: at least one processor, comprising processing circuitry, and a memory. The memory is communicatively coupled to at least one processor and stores processor-executable instructions, wherein at least one processor is configured to receive an encrypted Quick User Datagram Protocol (UDP) Internet Connection (QUIC) data packet flow from a source. At least one processor is configured to predict, using an Artificial Intelligence (AI) model, a relevancy of decryption for an encrypted QUIC initial handshake packet of the QUIC data packet flow based on at least one of pre-stored User Equipment (UE) context parameters, pre-stored server context parameters and flow context parameters of the encrypted QUIC data packet flow. At least one processor is configured to decrypt the encrypted QUIC initial handshake packet based on the relevancy of the decryption being predicted to be useful.

The foregoing summary is merely illustrative and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and/or other aspects, features and advantages of certain embodiments of the present disclosure will be more apparent from the following detailed description, taken in conjunction with the accompanying drawings, in which like reference numerals refer to like elements, and in which.

Figure 1:
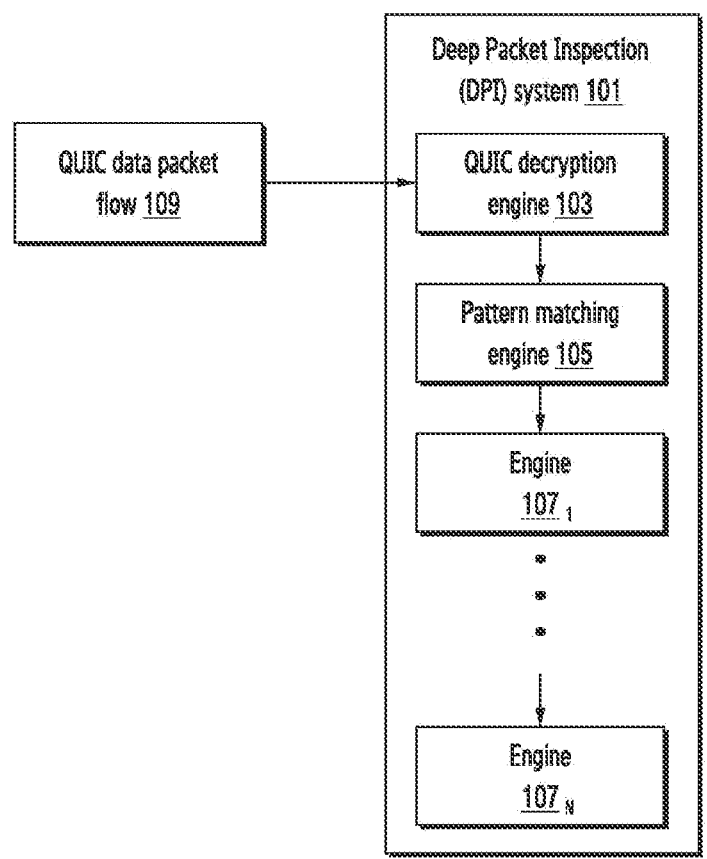
FIG. 1 is a diagram illustrating an existing Deep Packet Inspection (DPI) system according to the prior art.

It should be appreciated by those skilled in the art that any block diagrams herein represent conceptual views of illustrative systems embodying the principles of the present disclosure. Similarly, it will be appreciated that any flowcharts, flow diagrams, state transition diagrams, pseudo code, and the like represent various processes which may be substantially represented in computer-readable medium and executed by a computer or processor(s), whether such computer or processor(s) is explicitly shown.

DETAILED DESCRIPTION

In the present disclosure, the word "exemplary" is used herein to refer to "serving as an example, instance, or illustration." Any embodiment or implementation of the present subject matter described herein as "exemplary" is not necessarily to be construed as preferred or advantageous over various embodiments.

While the disclosure is susceptible to various modifications and alternative forms, various example embodiments thereof are shown by way of example in the drawings and will be described in greater detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

FIG. 1 is a diagram illustrating a typical Deep Packet Inspection (DPI) system engine pipeline for Quick User Datagram Protocol (UDP) Internet Connection (QUIC) packet processing according to the prior art. When an encrypted QUIC data packet flow is received, the DPI system decrypts the encrypted QUIC initial handshake packet. As an example, the encrypted QUIC initial handshake packet may be referred as a QUIC Client Hello packet. The DPI system performs decryption to obtain plain text SNI and then the plain text SNI is sent to a pattern matching engine for further processing. The QUIC data packet flow is also sent to other engines like port-based engine, behavior based engine etc. which are specific to a given DPI solution. If the SNI matches with signatures pre-stored in the DPI system, decryption is considered to be successful. If the SNI does not match with signatures pre-stored in the DPI system, the decryption is considered to be unsuccessful. Therefore, a typical DPI system which is conventionally known in the art, decrypts every encrypted QUIC data packet flow received by the DPI system, without any knowledge of whether it would be useful to decrypt the encrypted QUIC data packet flow, thereby leading to an unnecessary overhead for the DPI system. Decrypting every encrypted QUIC data packet flow and performing pattern matching to determine if the SNI matches with pre-stored signatures consumes more than 50% of total CPU cycles. Therefore, the typical DPI system deals with the problems of unnecessary consumption of CPU resources, CPU overload due to the need for decrypting every QUIC data packet flow, and substantive time delay as each QUIC data packet flow should be decrypted mandatorily to obtain plain text SNI and then infer usefulness of the QUIC data packet flow.

The present disclosure relates, for example, to a method and apparatus for network traffic management. In the context of the present disclosure, the apparatus may be a network entity, wherein the network entity is configured with or in other embodiments, associated with a decrypting system. The decrypting system of the network entity disclosed in the present disclosure may use an Artificial Intelligence (AI) model to predict the relevancy of decrypting the encrypted QUIC initial handshake packet of the QUIC data packet flow. The AI model may predict based on at least one of pre-stored User Equipment (UE) context parameters, pre-stored server context parameters and flow context parameters of the encrypted QUIC data packet flow. According to the present disclosure, when an encrypted QUIC data packet flow is received from a source by the disclosed decrypting system, the decrypting system may extract flow context parameters from the QUIC data packet flow. The flow context parameters may include one or more packet features which may include, without limitation, at least one of a server Internet Protocol (IP) address, server port number, User Equipment (UE) IP address, UE port number and packet bytes in the encrypted QUIC initial handshake packet. Upon extracting the flow context parameters, the decrypting system using the AI model may predict the relevancy of decrypting the encrypted QUIC initial handshake packet. The encrypted QUIC initial handshake packet may be the first packet in the QUIC data packet flow used to establish a connection. The relevancy of the decryption may be a predictive measure of whether a Server Name Identifier (SNI) included in an encrypted content in the encrypted QUIC initial handshake packet would match one or more pre-stored signatures, when decrypted. Upon predicting the relevancy, the decrypting system may decrypt the encrypted QUIC initial handshake packet when the relevancy of the decryption is predicted to be useful. The decrypting system may decrypt the SNI from the encrypted content in the encrypted QUIC initial handshake packet. If the SNI matches the one or more pre-stored signatures, the prediction made by the AI model is correct. If the SNI does not match with the one or more pre-stored signatures, the prediction made by the AI model is incorrect and the feedback is provided to the AI model which helps the AI model to enhance the accuracy in prediction. The decrypting system may update the pre-stored UE context parameters, and the pre-stored server context parameters. Details related to the updating of the pre-stored UE context parameters, and the pre-stored server context parameters are described in greater detail below with reference to the figures.

In another scenario, when the AI model predicts the decryption to be not useful, the decrypting system may forward the QUIC data packet flow to one or more processing engines, without decrypting, for performing the one or more operations. The decrypting system may update the pre-stored UE context parameters, and the pre-stored server context parameters upon forwarding the QUIC data packet flow. To verify the correctness of the prediction related to the relevancy of the decryption, the decrypting may select a few QUIC data packet flows which were predicted as not useful when decrypted by the AI model. Such QUIC data packet flows are decrypted and the SNI is compared with one or more pre-stored signatures. If the SNI matches the one or more pre-stored signatures, the prediction made by the AI model is inferred to be incorrect and the feedback is provided to the AI model which helps the AI model to enhance the accuracy in prediction for future prediction cycles. In other words, if the AI model is a Reinforcement Learning (RL) model, the AI model may be penalized for incorrect prediction that helps the AI model to learn that the prediction is incorrect and rectifies in the future prediction cycles. If the SNI does not match with the one or more pre-stored signatures, and the prediction of the AI model is inferred to be correct and the feedback is provided to the AI model which helps the AI model to enhance the accuracy in prediction. In other words, if the AI model is a RL model, the AI model may be rewarded for correct prediction that helps the AI model to learn that the prediction is correct and helps the AI model in the future prediction cycles.

The disclosed method may predict the relevancy of decryption using the AI model and may then decrypt the encrypted QUIC data packet flow, which avoids the need to decrypt every QUIC data packet flow received by the DPI system. This helps to improve the DPI throughput and optimal usage of CPU resources. As the total CPU consumption due to decryption is substantially reduced, CPU resources can be available and allocated for different tasks. The disclosed method may use pre-stored UE context parameters, pre-stored server context parameters and flow context parameters of the encrypted QUIC data packet flow to predict the relevancy of decryption. This helps the AI model to predict based on real-time values, which ensures accurate prediction based on the real-time information. For example, the pre-stored UE context parameters indicate the recently used applications by the UE which helps to predict the relevancy as the upcoming encrypted QUIC data packet flow may be related to the application currently used in the UE. The disclosed method verifies the prediction performed by the AI model which helps to enhance the accuracy of the AI model. For example, the disclosed method may randomly verify the predictions made by the AI model by decrypting QUIC data packet flow and matching the SNI with the one or more pre-stored signatures.

In the following detailed description of various example embodiments of the disclosure, reference is made to the accompanying drawings that form a part hereof, and in which are shown by way of illustration example embodiments in which the disclosure may be practiced. It is to be understood that various embodiments may be utilized and that changes may be made without departing from the scope of the present disclosure. The following description is, therefore, not to be taken in a limiting sense.

Figure 2A:
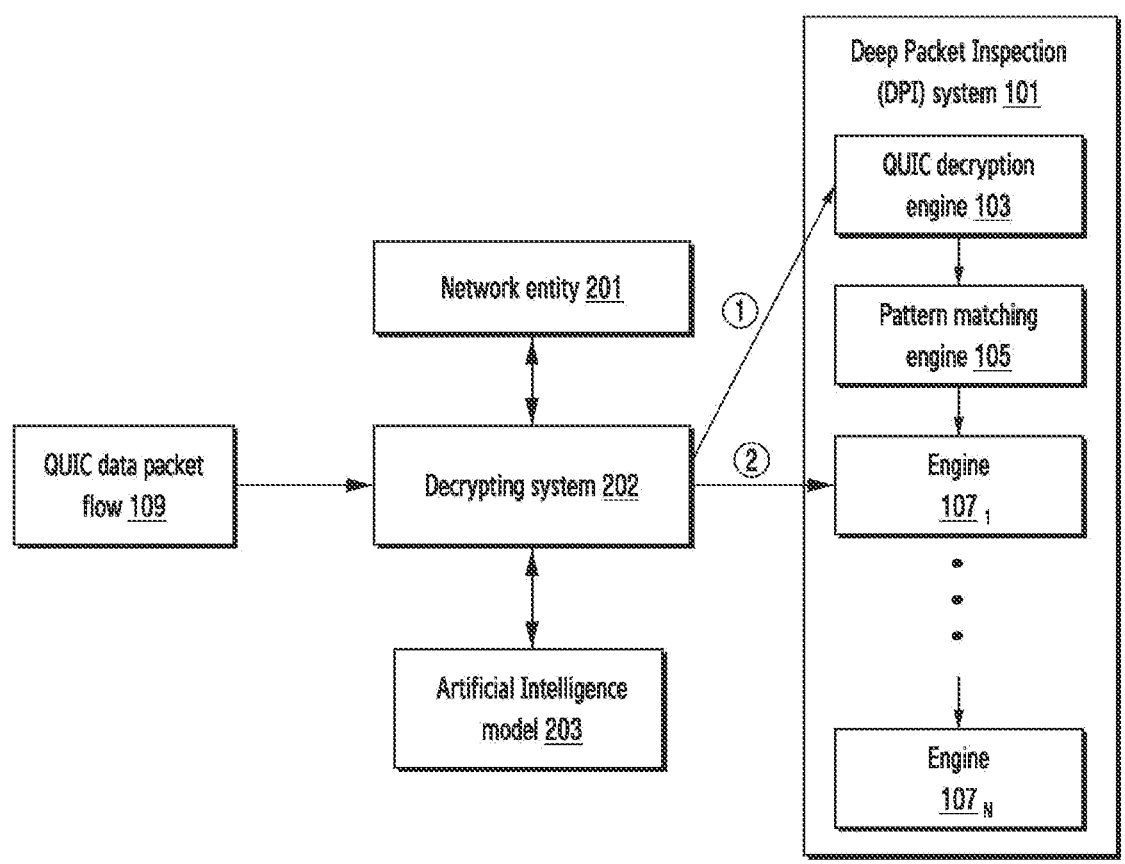
FIG. 2A is a block diagram illustrating an example architecture for network traffic management using a decrypting system, according to various embodiments.

FIG. 2A is a block diagram illustrating an example architecture for network traffic management using a disclosed decrypting system, according to various embodiments.

Example architecture may comprise a network entity 201, decrypting system 202, a trained Artificial Intelligence (AI) model 203 and a Deep Packet Inspection (DPI) system 101. In various embodiments, the network entity 201 of a telecommunication network may include a decrypting system 202 and the DPI system 101 configured to perform network traffic management. As an example, when the network entity 201 is associated with a 5th Generation (5G) network, the network entity 201 may be a User Plane Function (UPF) in the 5G network. Similarly, when the network entity 201 is associated with a 4th Generation (4G) network, the network entity 201 may be a Packet Data Network Gateway (PGW) in the 4G network. However, this should not be understood to be a limitation of the present disclosure, as the network entity 201 may be any other network entity other than the UPF and the PGW. The AI model 203 may be associated with the decrypting system using a communication network (not shown in figure). As an example, the communication network may be a wired communication network, a wireless communication network or a combination of both. The AI model 203 may be within the decrypting system 201. The DPI system 101 may be configured to decrypt an encrypted Quick User Datagram Protocol (UDP) Internet Connection (QUIC) data packet flow 109. For example, the DPI system 101 may be configured to decrypt an encrypted QUIC initial handshake packet. The DPI system 101 may be associated with the decrypting system 201 as shown in FIG. 2A. In various embodiments, the DPI system 101 may be external to the network entity 201 and associated with the decrypting system 201 through a communication network (not shown in figure). As an example, the communication network may be a wired communication network, a wireless communication network or a combination of both. The DPI system 101 performs specific operations upon receiving instructions from the network entity 201. The DPI system 101 may include, without limitation, a QUIC decryption engine (e.g., including various processing circuitry and/or executable program instructions) 103, a pattern matching engine (e.g., including various processing circuitry and/or executable program instructions) 105 and one or more processing engines (e.g., including various processing circuitry and/or executable program instructions) $107_1$-$107_N$ (also referred as one or more processing engines 107) for performing one or more operations. As an example, the one or more operations may be payload inspection, data analysis, action decision or the like.

In an embodiment, the decrypting system 202 may be configured to receive the encrypted QUIC data packet flow 109 from a source. The source may include, without limitation a User Equipment (UE) and a server. As an example, a user may be using a social networking application, and the UE receives QUIC data packet flow 109 for the social networking application from the server through the telecommunication network.

In an embodiment, upon receiving the encrypted QUIC data packet flow 109, the decrypting system 202 may be configured to predict using the AI model 203, a relevancy of decryption for an encrypted QUIC initial handshake packet of the QUIC data packet flow 109 based on at least one of pre-stored User Equipment (UE) context parameters, pre-stored server context parameters and flow context parameters of the encrypted QUIC data packet flow 109. In an embodiment, the AI model 203 may include a Reinforcement Learning (RL) model. In various embodiments, the AI model 203 used in the context of the disclosure may include, for example, and without limitation, a decision tree classifier, a random forest classifier, a gradient boosting, a logistic regression, k-neighbors classifier and support vector classifier. The pre-stored UE context parameters may include, without limitation, at least one of a UE Internet Protocol (IP) address, total number of QUIC data packet flows related to the UE in a first predefined time, total number of useful QUIC data packet flows among the total number of QUIC data packet flows related to the UE in the first predefined time and a QUIC Usefulness Indicator (QUI) value indicating usefulness of the QUIC data packet flow 109 for DPI application detection. As an example, the first predefined time may be 5 minutes. Table with example values of the pre-stored UE context parameters is shown in Table A below. The QUI value in the pre-stored UE context parameters may be determined based on number of QUIC data packet flows 109 of a specific application for a UE in a current time cycle, total number of the QUIC data packet flows 109 identified for the specific application in the current time cycle and probability of receiving a new QUIC data packet flow 109 for the specific application. An example equation to determine the QUI value is shown in Equation 1 in a further section of the description. Further, the pre-stored server context parameters may include, without limitation, at least one of a server Internet Protocol (IP) address, total number of QUIC data packet flows related to the server in a second predefined time and total number of useful QUIC data packet flows among the total number of QUIC data packet flows related to the server in the second predefined time. As an example, the second predefined time may be 60 minutes. Table with example values of the pre-stored UE context parameters is shown in Table D below. The pre-stored UE context parameters and the pre-stored server context parameters may be updated upon receiving each QUIC data packet flow 109 and at predefined time intervals. As an example, the values in the pre-stored UE context parameters and the pre-stored server context parameters may be reset to "0" after expiry of the first predefined time and the second predefined time. This allows to store the real-time or near to real-time values in the pre-stored UE context parameters and the pre-stored server context parameters. The AI model 203 may be trained using at least one of the pre-stored User Equipment (UE) context parameters and pre-stored server context parameters which helps the AI model 203 to predict the relevancy of the decryption.

The flow context parameters may be extracted from the encrypted QUIC data packet flow 109 received from the source. Each time the encrypted QUIC data packet flow 109 is received, the decrypting system 202 may extract the flow context parameters. The flow context parameters may include one or more packet features which may include, without limitation, at least one of a server Internet Protocol (IP) address, server port number, UE IP address, UE port number and packet bytes in the encrypted QUIC initial handshake packet. As an example, the server port number of the encrypted QUIC data packet flow 109 may be UDP. The decrypting system 202 may also perform basic header sanity to check if the encrypted QUIC data packet flow 109 contains Internet Engineering Task Force (IETF) QUIC Initial Packet.

The encrypted QUIC initial handshake packet may be the first packet in the QUIC data packet flow 109 used to establish a connection. As an example, the encrypted QUIC initial handshake packet may be a client Hello packet. The client Hello packet may be pseudo encrypted in the encrypted QUIC data packet flow 109. The encrypted QUIC data packet flow 109 may also include a payload which may be encrypted. The encrypted QUIC initial handshake packet may include a Server Name Identifier (SNI) which may be encrypted. The SNI may contain the hostname of the server from which the packet is sent. The SNI is decrypted into a plaintext and the plaintext SNI may be compared with one or more pre-stored signatures to identify the hostname of the server. In various embodiments, relevancy of the decryption predicted by the AI model 203 may be a predictive measure of whether the SNI in an encrypted content of the encrypted QUIC initial handshake packet would match with one or more pre-stored signatures, when decrypted.

In an embodiment, upon predicting the relevancy of the decryption, the decrypting system 202 may be configured to decrypt the encrypted QUIC initial handshake packet when the relevancy of the decryption is predicted to be useful. In various embodiments, the decrypting system 202 may forward the encrypted QUIC initial handshake packet to QUIC decryption engine 103 in the DPI system 101 to decrypt the encrypted QUIC initial handshake packet (Shown as 1 in FIG. 2A). In various embodiments, the decrypting system 202 may decrypt the SNI from the encrypted content in the encrypted QUIC initial handshake packet. Upon decrypting the SNI, the decrypting system 202 may verify the correctness of the prediction related to the relevancy of the decryption based on a comparison of the SNI with the one or more pre-stored signatures. In various embodiments, the pattern matching engine 105 in DPI system 101 may be used to verify the correctness of the prediction. When the SNI matches with the one or more pre-stored signatures, then the prediction is inferred to be successful and thereafter, application detection is performed based on the SNI. In various embodiments, application detection includes detecting specific application to which the SNI is associated. As an example, based on the SNI, the DPI system 101 may detect that the QUIC data packet flow 109 belongs to a streaming application "ABC". In various embodiments, each of the one or more pre-stored signatures may be mapped to a corresponding application that the pre-stored signature represents. Therefore, when the SNI matches with one of the one or more pre-stored signatures, the QUIC data packet flow 109 from which the SNI was decrypted would be inferred as a flow belonging to the application which is mapped to the corresponding pre-stored signature. Based on such application detection, the QUIC data packet flows may be classified and streamlined as per the Standard Operating Procedures (SOPs) of the network operators.

In various embodiments, the decrypting system 202 may update the pre-stored UE context parameters, and the pre-stored server context parameters upon forwarding the QUIC data packet flow 109 for decryption. When the SNI matches one or more pre-stored signatures, the decrypting system 202 may update the total number of useful QUIC data packet flow among the total number of QUIC data packet flows parameter value and the total number of QUIC data packet flows parameter value in the pre-stored UE context parameters and the pre-stored server context parameters. But when the SNI does not match with the one or more pre-stored signatures, the decrypting system 202 may update the total number of QUIC data packet flows parameter value in the pre-stored UE context parameters and the pre-stored server context parameters. In this scenario, the total number of useful QUIC data packet flow parameter value may not be updated as decrypting the QUIC data packet flow 109 was not useful as the SNI did not match with the one or more pre-stored signatures. Updating of parameters is explained in greater detail below.

In an embodiment, when the decrypting system 202 predicts that the relevancy of decrypting the encrypted QUIC initial handshake packet is not useful, the decrypting system 202 may forward the QUIC data packet flow 109 to one or more processing engines 107 directly for performing one or more operations, without performing decryption by passing through the QUIC decryption engine 103 and pattern matching engine 105 (Shown as 2 in FIG. 2A). The decrypting system 202 may update the pre-stored UE context parameters, and the pre-stored server context parameters upon forwarding the QUIC data packet flow 109. For example, the decrypting system 202 may update the total number of QUIC data packet flows parameter value. However, the total number of useful QUIC data packet flow parameter value is not updated as the AI model 203 predicted the relevancy of decryption to be not useful.

Figure 2B:
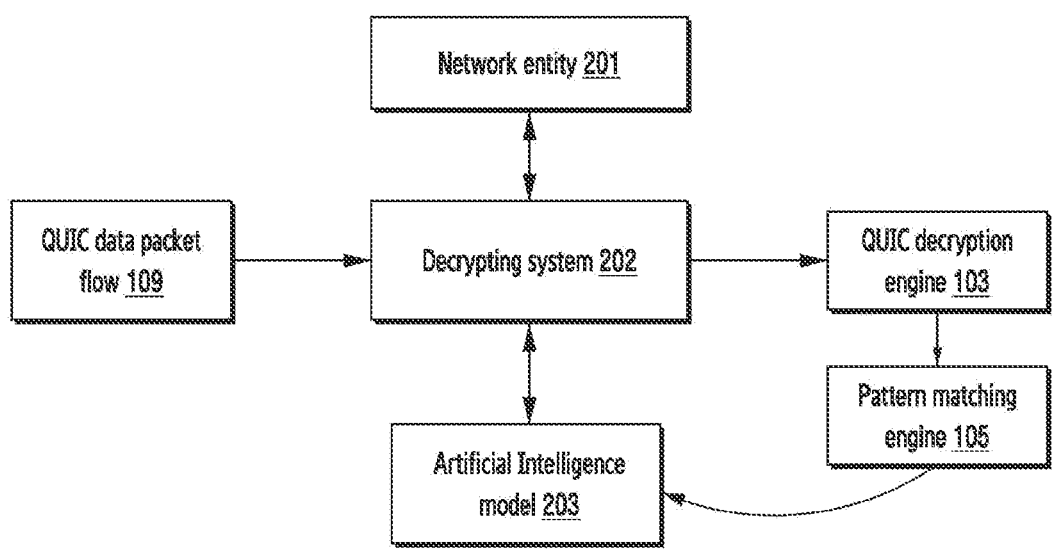
FIG. 2B is a block diagram illustrating an example architecture of reinforcement learning, according to various embodiments.

In an embodiment, to verify the prediction of the AI model 203 and to enhance the accuracy of prediction by the AI model 203, the decrypting system 202 may randomly select one or more QUIC data packet flows 109 from a plurality of QUIC data packet flows 109 which were not decrypted as the AI model 203 predicted the relevancy of the decryption to be not useful. The decrypting system 202 may decrypt the SNI from the encrypted content in the encrypted QUIC initial handshake packet of the one or more QUIC data packet flows 109 using QUIC decryption engine 103. Upon decrypting the SNI, the plain text SNI is compared with the one or more pre-stored signatures. If the plain text SNI matches with the one or more pre-stored signatures, the prediction of the AI model 203 is incorrect and a feedback is sent to the AI model 203 (as shown in FIG. 2B). The feedback may include a reward or a punishment which may help to enhance the accuracy of prediction by the AI model 203. In various embodiments, AI model 203 receives feedback when the AI model 203 is RL model. The AI model 203 may be punished in this scenario as the prediction by the AI model 203 was inferred to be incorrect. If the plain text SNI does not match with the one or more pre-stored signatures, the prediction of the AI model 203 is inferred to be correct and a feedback is sent to the AI model 203. In this scenario, the AI model 203 may receive the reward as the prediction by the AI model 203 is inferred to be correct. In various embodiments, verification of the prediction may be performed at predefined intervals to enhance accuracy of prediction.

Figure 3:
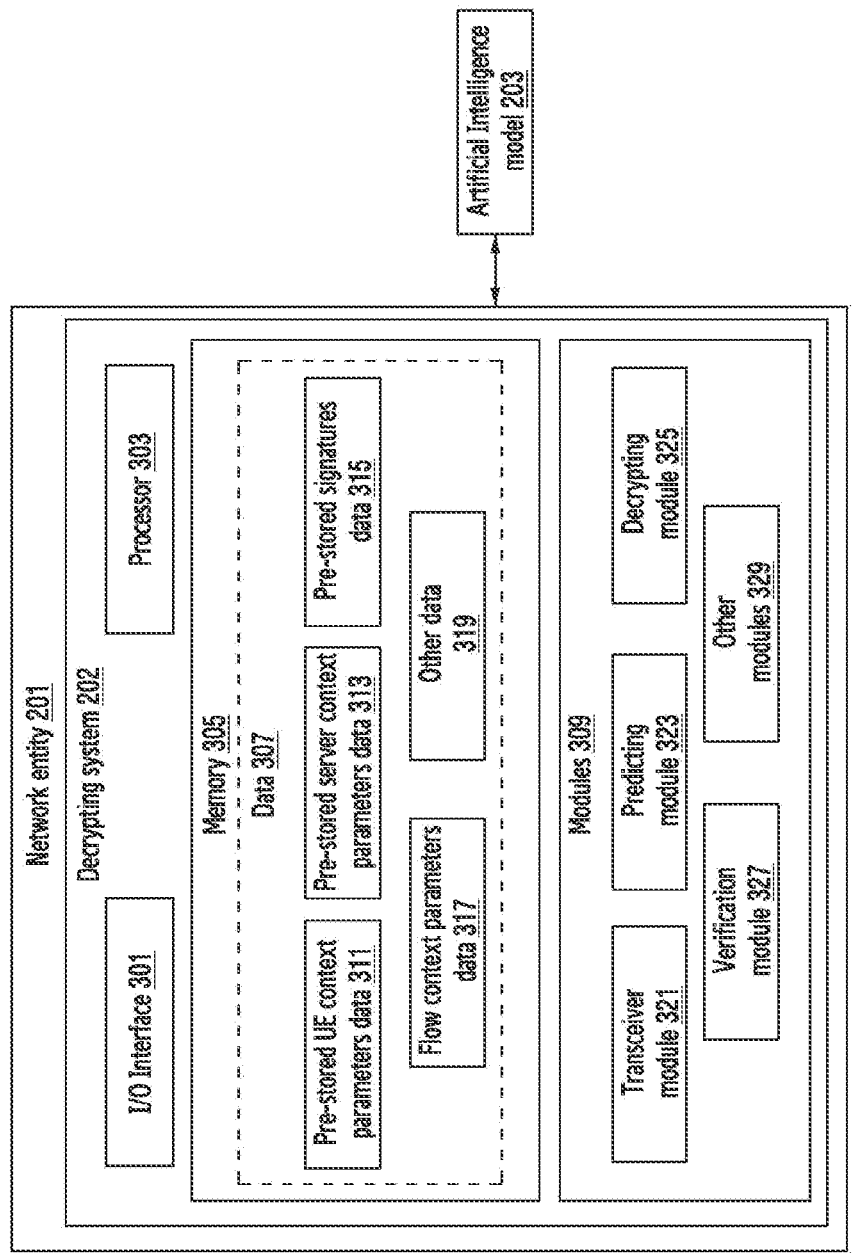
FIG. 3 is a block diagram illustrating an example configuration of a network entity, according to various embodiments.

FIG. 3 is a block diagram illustrating an example configuration of a network entity 201, according to various embodiments.

In various implementations, the network entity 201 may be associated with a decrypting system 202, the decrypting system 202 may include an I/O interface (e.g., including circuitry) 301, a processor (e.g., including processing circuitry) 303 and a memory 305. In an embodiment, the memory 305 may be communicatively coupled to the processor 303. The processor 303 may be configured to perform one or more functions of the decrypting system 202 for network traffic management, using the data 307 and the one or more modules 309 of the decrypting system 202. In an embodiment, the memory 305 may store data 307. The various modules may include various processing circuitry and/or executable program instructions. The processor 303 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the data 307 stored in the memory 305 may include, without limitation, pre-stored User Equipment (UE) context parameters data 311, pre-stored server context parameters data 313, pre-stored signatures data 315, flow context parameters data 317 and other data 319. In some implementations, the data 307 may be stored within the memory 305 in the form of various data structures. Additionally, the data 307 may be organized using data models, such as relational or hierarchical data models. The other data 319 may include various temporary data and files generated by the one or more modules 309.

In an embodiment, the pre-stored UE context parameters data 311 may store one or more pre-stored UE context parameters which may include, without limitation, a UE Internet Protocol (IP) address, total number of QUIC data packet flows related to the UE in a first predefined time, total number of useful QUIC data packet flows among the total number of QUIC data packet flows related to the UE in the first predefined time and a Quick User Datagram Protocol (UDP) Internet Connection (QUIC) Usefulness Indicator (QUI) value indicating usefulness of the QUIC data packet flow 109 for Deep Packet Inspection (DPI) application detection. Table A below illustrates one or more UE context parameters with example values:

TABLE A

| UE IP | Total number of QUIC data packet flows related to UE in first predefined time | Total number of useful QUIC data packet flows among total number of QUIC data packet flows related to UE in first predefined time |
|---|---|---|
| 10.10.1.101 | 10 | 10 |
| 10.10.1.102 | 0 | 0 |
| 10.10.1.103 | 8 | 1 |
| 10.10.1.104 | 15 | 10 |
| 10.10.1.105 | 0 | 0 |

As shown in the above Table A, the IP address of each UE is stored. Also, the total number of QUIC data packet flows related to each UE in the first predefined time and the total number of useful QUIC data packet flows among the total number of QUIC data packet flows related to each UE in the first predefined time is stored in the pre-stored UE context parameters data 311. As an example, the first predefined time may be 5 minutes. The pre-stored UE context parameters may be updated upon receiving each QUIC data packet flow 109 and at predefined time intervals. As an example, the values in the pre-stored UE context parameters may be reset to "0" after expiry of the first predefined time. The near to real time values are stored in the pre-stored UE context parameters. In an embodiment, the total number of QUIC data packet flows may be the QUIC data packet flows 109 seen from the UE. When an encrypted QUIC initial handshake packet is decrypted and a Server Name Identifier (SNI) from an encrypted content in the encrypted QUIC initial handshake packet matches with one or more pre-stored signatures, the number of useful QUIC data packet flows 109 is updated. If the SNI does not match with the one or more pre-stored signatures, the number of useful QUIC data packet flows 109 is not updated. As an example, consider UE having an IP address "10.10.1.104" from the above Table A. As shown in Table A, the total number of QUIC data packet flows seen from the UE is "15". However, the total number of useful QUIC data packet flows among the total number of QUIC data packet flows related to the UE is "10". This may refer, for example, to among "15" QUIC data packet flows 109, the SNI in only "10" QUIC data packet flows 109 matched with the one or more pre-stored signatures when the encrypted QUIC initial handshake packet being decrypted.

In an embodiment, QUIC Usefulness Indicator (QUI) value which indicates usefulness of the QUIC data packet flow 109 for Deep Packet Inspection (DPI) application detection may also be stored in the pre-stored UE context parameters data 311. In an embodiment, the QUI value may be determined based on number of QUIC data packet flows 109 of a specific application for a UE in a current time cycle, total number of the QUIC data packet flows 109 identified for the specific application in the current time cycle and probability of receiving a new QUIC data packet flow 109 for the specific application. An example equation for calculating QUI is shown below:

$$QUI = \frac{\sum_{i=1}^{n} W_i * P_i}{\sum_{i=1}^{n} W_i} \quad (1)$$

n is number of QUIC data packet flows 109 of a specific application for a UE in a current time cycle;

$W_i$ is total number of the QUIC data packet flows 109 identified for the specific application in the current time cycle;

$P_i$ is probability of receiving a new QUIC data packet flow 109 for the specific application In an embodiment, to calculate the QUI value, the decrypting system 202 stores predefined number of recent applications used by the UE in the first predefined time. As an example, the decrypting system 202 may store 5 recent applications used in the first predefined time. Each UE application usage information may be stored locally for each UE and the UE usage information for each UE may be different. When the user uses a new application, Least Recently Used (LRU) is updated. After first predefined time, the application usage information may be reset. As example, consider below Table B which illustrates the UE application usage information for the UE:

TABLE B

| Application used in the UE | Total flows |
|---|---|
| Social media application - 1 | 12 |
| Gaming application | 4 |
| Video streaming application | 6 |
| News application | 5 |
| QUIC | 2 |

In an embodiment, to calculate the QUI value, the decrypting system 202 stores total number of flows from each application and the total number of QUIC data packet flows among the total number of flows from each application. This information is not specific to each UE. As example, consider below Table C which illustrates the flows from each application and QUIC data packet flows among the total flows:

TABLE C

| Application | Total flows | QUIC data packet flows among total flows |
|---|---|---|
| Social media application - 1 | 1302 | 0 (0%) |
| Gaming application | 10000 | 7000 (70%) |
| Video streaming application | 20000 | 18000 (90%) |
| News application | 500 | 150 (30%) |
| QUIC | 100K | 10K (−10%) |

Using the local UE table values and global application table values, the QUI value may be determined. Example computation by equating the example values as shown in above Table B and Table C to the equation 1 is shown below:

$$QUI = \frac{4*0.70 + 6*0.90 + 5*0.30 - 2*0.10}{4+6+5+2} = 0.56$$

As shown in the calculation above, the values from Table B and Table C are used to determine the QUI value. The last row in both tables B and C is generic QUIC data packet flows, the probability value is negative because out of all flows, 10% flows are detected as generic QUIC data packet flow and not as any application flow. Decrypting SNI for such flows is not useful as the SNI may not match with the one or more pre-stored signatures. According to Table B 2 QUIC data packet flows have been received in the given time cycle. However, these QUIC data packet flows could be generated by an application which DPI system 101 may not be able to detect. In various embodiments, an application that the DPI system 101 may not be able to detect an application whose pre-stored signature is not added in the DPI system. In other words, the SNI obtained by decrypting QUIC initial handshake packet of the QUIC data packet flow does not match with any of the pre-stored signatures as the signature representing the application to which the QUIC data packet flow belongs, is not pre-stored in the DPI system 101. In that case, the value associated with generic QUIC data packet flow is deducted from the QUI value as the value indicates that the QUIC data packet flow may be a generic QUIC data packet flow and may not be detected as application flow. Also, the Social media application-1 shown in Table C does not use QUIC, so the values of the Social media application-1 are not used during the calculation of the QUI value as these values may not affect QUI value. In various embodiments, the QUI value is provided to the AI model 203 as input along with the UE Internet Protocol (IP) address, the total number of QUIC data packet flows related to the UE in a first predefined time and the total number of useful QUIC data packet flows among the total number of QUIC data packet flows related to the UE in the first predefined time.

In an embodiment, the pre-stored server context parameters data 313 may store one or more pre-stored server context parameters which may include, without limitation, a server Internet Protocol (IP) address, total number of QUIC data packet flows related to the server in a second predefined time and total number of useful QUIC data packet flows among the total number of QUIC data packet flows related to the server in the second predefined time. Table D below illustrates one or more UE context parameters with example values:

TABLE D

| Server IP/Subnet | Total QUIC data packet flows in last n hours | Total Useful QUIC data packet flows in last n minute |
|---|---|---|
| 31.1.1.0/24 | 100000 | 100000 |
| 17.1.1.0/24 | 20000 | 0 |
| 157.13.1.0/24 | 30000 | 15000 |
| 203.1.1.1/24 | 180000 | 1500 |
| 104.10.1.1/24 | 4000 | 0 |

As shown in the above Table D, the IP address of each server is stored. The subnet along with the IP address may also be stored. Also, the total number of QUIC data packet flows related to each server in the second predefined time and the total number of useful QUIC data packet flows among the total number of QUIC data packet flows related to each server in the second predefined time is stored in the pre-stored server context parameters data 313. As an example, the second predefined time may be 60 minutes. The pre-stored server context parameters may be updated upon receiving each QUIC data packet flow 109 and at predefined time intervals. As an example, the values in the pre-stored server context parameters may be reset to "0" after expiry of the second predefined time. The near to real time values are stored in the pre-stored server context parameters. In an embodiment, the total number of QUIC data packet flows may be the QUIC data packet flows 109 seen from the server. When an encrypted QUIC initial handshake packet is decrypted and the SNI from the encrypted content in the encrypted QUIC initial handshake packet matches with the one or more pre-stored signatures, the number of useful QUIC data packet flows 109 is updated. If the SNI does not match with the one or more pre-stored signatures, the number of useful QUIC data packet flows 109 is not updated. As an example, consider sever having an IP address "203.1.1.1/24" from the above Table D. As shown in the Table D, the total number of QUIC data packet flows seen from the server is "180000". However, the total number of useful QUIC data packet flows among the total number of QUIC data packet flows related to the server is "1500". This refer, for example, to among 180000 QUIC data packet flows 109, the SNI in only 1500 QUIC data packet flows 109 matched with the one or more pre-stored signatures when the encrypted QUIC initial handshake packet being decrypted.

In an embodiment, the pre-stored signatures data 315 may include one or more pre-stored signatures related to various applications. In an embodiment, each of the one or more pre-stored signatures may be mapped to a corresponding application that the pre-stored signature represents. As an example, the signature may be a unique pattern of data used to identify incoming data packets. When the decrypting system 101 decrypts a Server Name Identifier (SNI) from the encrypted content in the encrypted QUIC initial handshake packet, the decrypting system 101 compares the SNI with the one or more pre-stored signatures to detect the application to which a QUIC data packet flow from which the SNI is decrypted, belongs to.

In an embodiment, the flow context parameters data 317 may store one or more packet features which may include, without limitation, a server IP address, server port number, UE IP address, UE port number and packet bytes in the encrypted QUIC initial handshake packet. The flow context parameters may be extracted from the QUIC data packet flow 109 received from the source. In an embodiment, a flow feature extractor may be used to extract features of the encrypted QUIC data packet flows 109 received from the source. The flow feature extractor may extract the server port number of the encrypted QUIC data packet flow 109. As an example, the server port number for QUIC is UDP. Similarly, the flow feature extractor may perform basic header sanity to check if the encrypted QUIC data packet flow 109 contains Internet Engineering Task Force (IETF) QUIC Initial Packet. Based on these criteria, the encrypted QUIC data packet flow 109 may be considered for the prediction. Other packet features such as server IP address, UE IP address, UE port number and packet bytes in the encrypted QUIC initial handshake packet may also be extracted by the flow feature extractor. The values for the flow context parameters data 317 may vary for each encrypted QUIC data packet flow 109.

In an embodiment, the data 307 may be processed by one or more modules 309 of the decrypting system 202. In various implementations, the one or more modules 309 may be communicatively coupled to the processor 303 for performing one or more functions of the decrypting system 202. In an implementation, the one or more modules 309 may include, without limiting to, a transceiver module 321, a predicting module 323, a decrypting module 325, a verification module 327 and other modules 329. In an embodiment, an Artificial Intelligence (AI) model 203 may be associated with the decrypting system 202 using a communication network (not shown in figures). As an example, the communication network may be a wired communication network, a wireless communication network or a combination of both, which enable internet connectivity.

As used herein, the term module may refer to an Application Specific Integrated Circuit (ASIC), an electronic circuit, a hardware processor 303 (shared, dedicated, or group) and memory that execute one or more software or firmware programs, a combinational logic circuit, and/or other suitable components that provide the described functionality. In an implementation, each of the one or more modules 309 may be configured as stand-alone hardware computing units. In an embodiment, the other modules 329 may be used to perform various miscellaneous functionalities on the decrypting system 202. It will be appreciated that such one or more modules 309 may be represented as a single module or a combination of different modules.

In an embodiment, the transceiver module 321 may include various circuitry and be configured for receiving an encrypted Quick User Datagram Protocol (UDP) Internet Connection (QUIC) data packet flow 109 from a source. The source may include, without limitation, a User Equipment (UE) and a server. As an example, the server of an application used by a user of the UE may transmit QUIC data packet flow 109 to the UE. For instance, if the application is a social media application like Instagram™, then server of Instagram™ may transmit QUIC data packet flow.

In an embodiment, the predicting module 323 may include various processing circuitry and/or executable program instructions and be configured for predicting using the AI model 203, a relevancy of decryption for an encrypted QUIC initial handshake packet of the QUIC data packet flow 109 based on at least one of pre-stored UE context parameters, pre-stored server context parameters and flow context parameters of the encrypted QUIC data packet flow 109. The relevancy of the decryption is a predictive measure of whether a Server Name Identifier (SNI) included in an encrypted content in the encrypted QUIC initial handshake packet would match with one or more pre-stored signatures, when decrypted. As shown in FIG. 3, the AI model 203 is associated with the decrypting system 202. In various embodiments, the AI model 203 may be configured in the decrypting system 202.

The AI model 203 may be trained using the pre-stored UE context parameters, pre-stored server context parameters and flow context parameters of the encrypted QUIC data packet flow for predicting the relevancy of decryption. For instance, the QUI value in the pre-stored UE context parameters determines usefulness of encrypted QUIC data packet flow. For determining the QUI value, various UE and server parameters are also considered. The AI model 203 may be trained to correlate the QUI value of the pre-stored UE context parameters and using pre-stored server context parameters, to predict the relevancy of decryption. Similarly, various other parameters of the pre-stored UE context parameters, pre-stored server context parameters and flow context parameters of the encrypted QUIC data packet flow may be used to train the AI model 203. As an example, consider a scenario wherein the UE from which the QUIC data packet flow is received, has sent majority of detectable QUIC data packet flows in the past cycles, for instance 10 detectable QUIC data packet flows. Therefore, in the UE context parameters, the total number of useful QUIC data packet flows among total number of QUIC data packet flows related to UE in first predefined time may be updated as 10. Thereafter, the QUI value of such QUIC data packet flow may be high for instance, 0.67, indicating usefulness of the QUIC data packet flow 109 for DPI application detection. Hence, when these two parameters are correlated, the AI model 203 may be trained to predict that the QUIC data packet flow is relevant for decryption. Similarly, training may be performed based on training data comprising UE context parameters, server context parameters and flow context parameters under different training scenarios.

In various embodiments, the pre-stored UE context parameters and the pre-stored server context parameters may be updated upon receiving each QUIC data packet flow 109 and at predefined time intervals. The updated UE context parameters and the updated server context parameters may be transmitted to the AI model 203 using the transceiver module 321. The AI model 203 learns using the updated parameters to improve the accuracy of predicting the relevancy of the decryption.

In an embodiment, the decrypting module 325 may include various processing circuitry and/or executable program instructions and be configured for decrypting the encrypted QUIC initial handshake packet when the relevancy of the decryption is predicted to be useful. In various embodiments, upon predicting the relevancy of decryption, the decrypting system 202 may forward the encrypted QUIC initial handshake packet of the QUIC data packet flow 109 to a QUIC decryption engine 103 of the DPI system 101 for decryption of the encrypted QUIC initial handshake packet. The QUIC decryption engine 103 of the DPI system 101 may decrypt the QUIC initial handshake packet to decrypt the SNI from an encrypted content in the encrypted QUIC initial handshake packet. The decrypted SNI may be present in a plain text format. Thereafter, the decrypted SNI in the plaintext format may be forwarded to the pattern matching engine 105 of the DPI system 101 for performing pattern matching. As part of pattern matching, the pattern matching engine 105 may compare the SNI with the one or more pre-stored signatures. If the SNI matches with the one or more pre-stored signatures, the prediction by the AI model 203 is correct. Upon comparing the SNI with one or more pre-stored signatures, the pre-stored UE context parameters and the pre-stored server context parameters are updated.

In an embodiment, to verify the prediction of the AI model 203 and to enhance the accuracy of the AI model 203, the verification module 327 may include various processing circuitry and/or executable program instructions and be configured to select one or more QUIC data packet flows 109 from a plurality of QUIC data packet flows 109 which were not decrypted as the AI model 203 predicted decryption to be not useful. In various embodiments, the selection of one or more QUIC data packet flows 109 from a plurality of QUIC data packet flows may be a random selection. The decrypting module 325 may decrypt the SNI from the encrypted content in the encrypted QUIC initial handshake packet of the one or more QUIC data packet flows 109. Upon decrypting the SNI, the plain text SNI is compared with the one or more pre-stored signatures. If the SNI matches with the one or more pre-stored signatures, the prediction of the AI model 203 is inferred to be incorrect and a feedback is provided to the AI model 203 (Shown in FIG. 2B). The AI model may be penalized for incorrect prediction that helps the AI model to learn that the prediction is incorrect and rectifies in the future prediction cycles. If the SNI does not match with the one or more pre-stored signatures, the prediction of the AI model 203 is inferred to be correct and a feedback is provided to the AI model 203. The AI model may be rewarded for correct prediction that helps the AI model to learn and enhance the accuracy in the future prediction cycles. The verification of the prediction and the enhancement of the accuracy may be performed at predefined intervals to predict accurate results. Table E below illustrates various classification AI models 203 tested for modeling the data with relevant hyperparameter of each AI model 203. The hyperparameter may be information such as weights and learning rate provided to the AI models 203.

TABLE E

| Model Name | Hyperparameter |
| --- | --- |
| Decision Tree Classifier | gini impurity criterion |
| Random Forest Classifier | number of trees = 10, gini impurity criterion |
| Gradient Boosting | number of trees = 10, learning rate = 0.1 |
| Logistic Regression l2 penalty and C = 1 | l2 penalty and C = 1 |
| K-Neighbors Classifier | With Euclidean distance, K = 2 |
| Support Vector Classifier | With Polynomial kernel |
| SGD Classifier | l2 penalty and hinge loss |

In various embodiments, the AI model 203 may be a Reinforcement Learning (RL) model. The RL model deals with learning how to make sequential decisions in an environment to maximize and/or increase a cumulative reward. The RL algorithms aim to train an agent to interact with an environment, learn from the feedback received in the form of rewards, and optimize its decision-making process over time. The AI model 203 may use Q-Learning which is a RL framework. Q-Learning is a model-free RL algorithm that learns the optimal action-value function, called the Qfunction. The Q-function estimates the expected cumulative reward for taking a specific action in each state. The RL model receives the pre-stored UE context parameters, the pre-stored server context parameters and flow context parameters as input and has 3 segments: Action, Environment, and Reward. The Reinforcement Learning model uses a simple Deep Neural Network (DNN), with 3 dense layers as function approximator, with the input and internal layer having Rectified Linear Unit (ReLU) activation and the output layer having softmax activation. The model used Adam optimizer with categorical cross entropy as loss function and accuracy as evaluation metrics. The overall goal of the AI model 203 is for the agent to learn an optimal policy that maximizes and/or increases the expected cumulative reward. By iteratively interacting with the environment, observing rewards, and updating its knowledge, the AI model 203 gradually improves its decision-making abilities and learns to classify encrypted QUIC data packet flow 109 effectively.

In various embodiments, when relevancy of the decryption is predicted to be not useful by the AI model 203, the QUIC data packet flow 109 is forwarded to one or more processing engines 107, without decrypting the QUIC data packet flow 109. Also, the pre-stored UE context parameters, and the pre-stored server context parameters may be updated upon forwarding the QUIC data packet flow 109 to the one or more processing engines 107.

Figure 4:
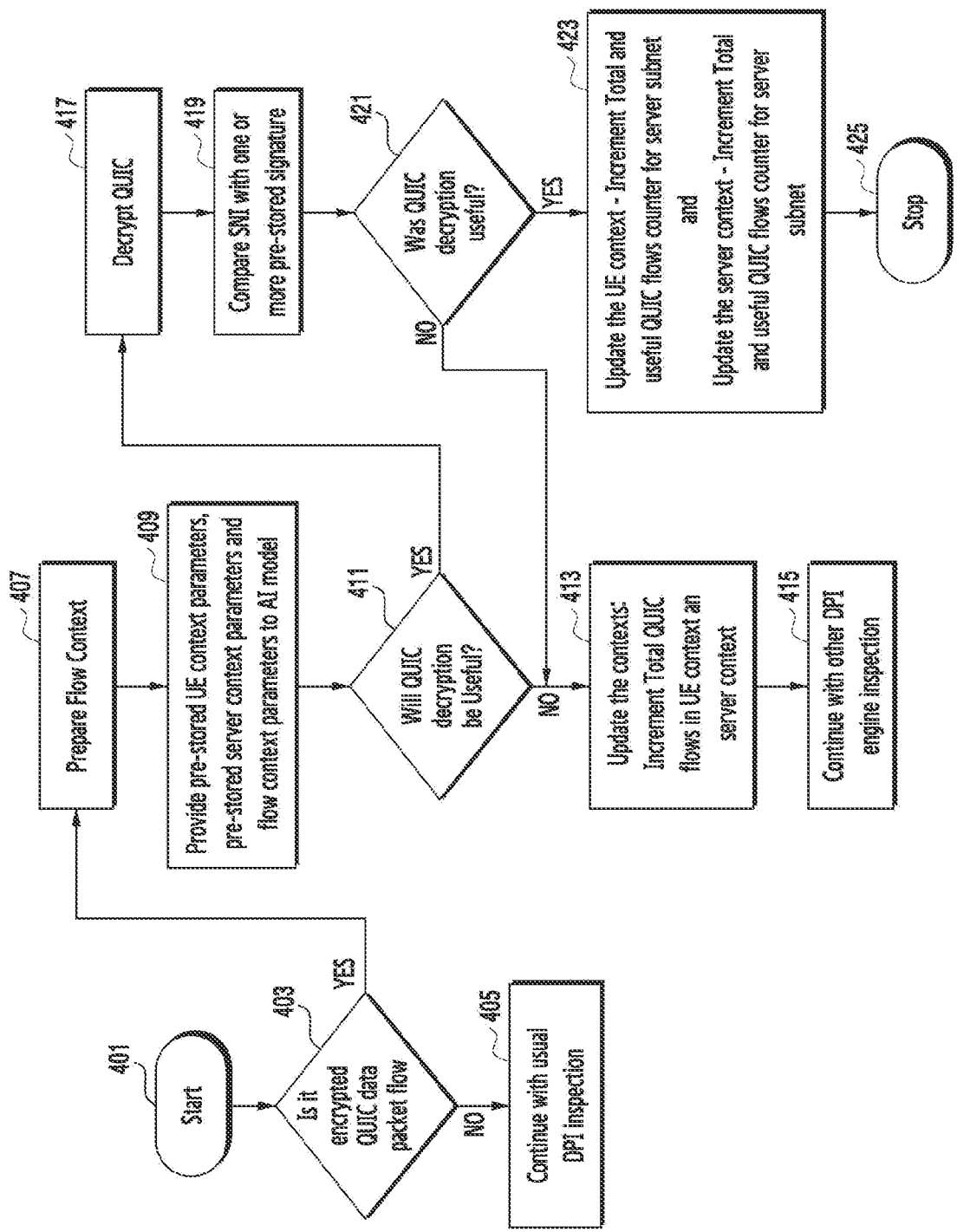
FIG. 4 is a flowchart illustrating an example method of network traffic management, according to various.

FIG. 4 is a flowchart illustrating an example method of network traffic management, according to various embodiments.

At step 401, the process of network traffic management is started. At step 403, the decrypting system 202 determines if received data packet flow is an encrypted QUIC data packet flow 109. As an example, the server port for the encrypted QUIC data packet flow 109 is UDP. At step 405, if it is determined that the received data packet flow is not the encrypted QUIC data packet flow 109, the usual Deep Packet Inspection (DPI) is performed on the received data packet flow. At step 407, flow context parameters are prepared by the decrypting system 202 when the received data packet flow is determined as the encrypted QUIC data packet flow 109. At step 409, an Artificial Intelligence (AI) model 203 receives pre-stored User Equipment (UE) context parameters, pre-stored server context parameters and flow context parameters of the encrypted QUIC data packet flow 109 which may be used to predict relevancy of decryption. At step 411, the AI model 203 predicts the relevancy of the decryption for an encrypted QUIC initial handshake packet of the QUIC data packet flow 109 based pre-stored UE context parameters, pre-stored server context parameters and flow context parameters of the encrypted QUIC data packet flow 109. If the AI model 203 predicts the relevancy of the decryption to be not useful, the total number of QUIC data packet flows parameter in pre-stored UE context parameters and pre-stored server context parameters are updated (step 413). Upon updating, the QUIC data packet flow 109 is forwarded to one or more processing engines 107, without decrypting, for performing one or more operations (Step 415).

At step 417, the encrypted QUIC initial handshake packet is decrypted when the relevancy of the decryption is predicted to be useful. In various embodiments, decryption involves decrypting a Server Name Identifier (SNI) from an encrypted content in the encrypted QUIC initial handshake packet. Thereafter, the plain text SNI obtained post decryption is compared with one or more pre-stored signatures (step 419). At step 421, if the SNI matches with the one or more pre-stored signatures, the decryption is inferred to be successful and parameters such as total number of useful QUIC data packet flows among the total number of QUIC data packet flows in the pre-stored UE context parameters and pre-stored server context parameters are updated (Step 423) and the process ends at step 425. If the SNI does not match with the one or more pre-stored signatures, the decryption is inferred to be not successful and AI model 203 receives a feedback from the decrypting system for incorrect prediction. For example, one or more operations (Step 413, Step 415) may be performed if the SNI does not math with the one or more pre-stored signatures.

Consider an example scenario of network traffic management by the decrypting system 202. The AI model 203 is trained using the pre-stored UE context parameters and the pre-stored server context parameters. Table F below illustrates the pre-stored UE context parameters with example values.

TABLE F

| UE IP | Total QUIC Flows |
| --- | --- |
| 10.10.1.100 (UE1) | 2 |
| 10.10.1.101 (UE2) | 1 |

The decrypting system 202 determines the QUI based on number of QUIC data packet flows 109 of a specific application for a UE in a current time cycle, total number of the QUIC data packet flows 109 identified for the specific application in the current time cycle and probability of receiving a new QUIC data packet flow 109 for the specific application. As example, consider below Table G and Table H which illustrate the UE application usage information for the UE1 and UE2 respectively:

TABLE G

| Application used in the UE1 - 10.10.1.100 | Total flows |
|---|---|
| Social media application - 1 | 1 |
| Gaming application | 1 |
| Video streaming application | 1 |

TABLE H

| Application used in the UE2 - 10.10.1.101 | Total flows |
|---|---|
| Social media application - 1 | 1 |

In an embodiment, to calculate the QUI value, the decrypting system 202 stores total number of flows from each application and the total number of QUIC data packet flows among the total number of flows from each application. This information is not specific to each UE. As an example, the Table I below illustrates application related information.

TABLE I

| Application | Total Flows | Total QUIC Flows | QUIC flow % |
|---|---|---|---|
| Social media application - 1 | 2 | 2 | 100% |
| Gaming application | 1 | 0 | 0% |
| Video streaming application | 1 | 1 | 100% |

Using the local UE table values and global application table values, the QUI value may be determined. Equating the values as shown in above Table H and Table I, to the equation 1 as shown below:

$$QUI = \frac{1*1 + 1*0 + 1*1}{1+1+1} = 0.67$$

The Table J below illustrates pre-stored server context parameters with example values:

TABLE J

| Server IP | Total QUIC Flows | Useful QUIC Flows |
|---|---|---|
| 31.1.1.0/24 | 2 | 2 |
| 169.1.1.0/24 | 1 | 0 |
| 216.1.1.0/24 | 1 | 1 |

Consider a scenario when an encrypted QUIC data packet flow 109 is received by the decrypting system 202 from a source. The UE IP of the encrypted QUIC data packet flow 109 is "10.10.1.100", the sever IP of the encrypted QUIC data packet flow 109 is 31.1.1.17 and the length is 1216 Bytes. Upon receiving the encrypted QUIC data packet flow 109, the decrypting system 202 fetches the pre-stored UE context parameters related to the UE IP address and the pre-stored server context parameters related to the server IP address extracted from the received encrypted QUIC data packet flow 109. The extracted pre-stored UE context parameters from Table F are shown below:

| UE IP | Total QUIC Flows | Useful QUIC Flows | QUI |
|---|---|---|---|
| 10.10.1.100 | 2 | 2 | 0.67 |

Similarly, the extracted pre-stored server context parameters from Table J are shown below:

| Server IP | Total QUIC Flows | Useful QUIC Flows |
|---|---|---|
| 31.1.1.0/24 | 2 | 2 |

Based on the pre-stored UE context parameters, the pre-stored server context parameters and the flow context parameters of the encrypted QUIC data packet flow 109 the AI model 203 determines the relevancy of decryption. As per the above example values, the AI model 203 predicts the relevancy of decryption to be useful. This may refer to the result of AI model 203 is '1' which indicates that the relevancy of decryption is useful. Upon predicting the relevancy of decryption, the decrypting system 202 decrypts the encrypted QUIC initial handshake packet using the QUIC decrypting engine 103 and determines SNI using pattern matching engine 105 of the DPI system 101, and thereafter performs one or more operations using the one or more processing engines 107. Also, the pre-stored UE context parameters, and the pre-stored server context parameters are updated. If the AI model 203 predicted the relevancy of decryption to be not useful, the decrypting system 202 forwards the QUIC data packet flow 109 to one or more processing engines 107, without decrypting, for performing the one or more operations. Further, the decrypting system 202 updates the pre-stored UE context parameters, and the pre-stored server context parameters upon forwarding the QUIC data packet flow 109.

Figure 5:
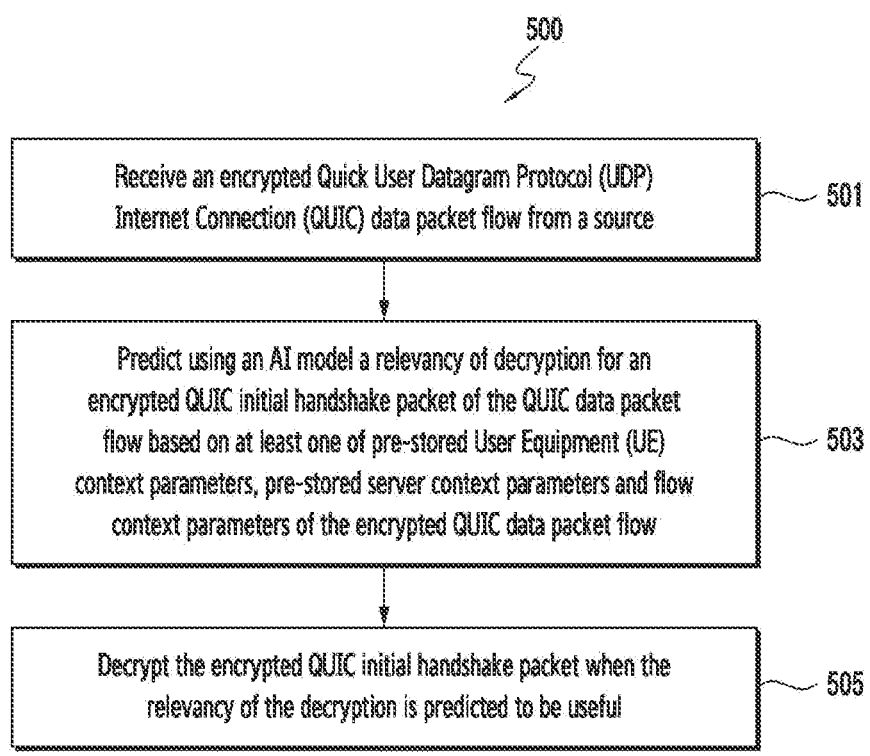
FIG. 5 is a flowchart illustrating an example method of network traffic management, according to various embodiments.

FIG. 5 is a flowchart illustrating an example method of network traffic management, according to various embodiments.

As illustrated in FIG. 5, the method 500 may include one or more blocks illustrating a method of network traffic management using the decrypting system 202 illustrated in FIG. 3. The method 500 may be described in the general context of computer executable instructions. Generally, computer executable instructions can include routines, programs, objects, components, data structures, procedures, modules, and functions, which perform specific functions or implement specific abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the method 500 includes receiving, by a processor 303 of the decrypting system 201, an encrypted Quick User Datagram Protocol (UDP) Internet Connection (QUIC) data packet flow 109 from a source. The source comprises at least one of a User Equipment (UE) and a server.

At block 503, the method 500 includes predicting using an Artificial Intelligence (AI) model 203, by the processor 303, a relevancy of decryption for an encrypted QUIC initial handshake packet of the QUIC data packet flow 109 based on at least one of pre-stored User Equipment (UE) context parameters, pre-stored server context parameters and flow context parameters of the encrypted QUIC data packet flow 109. The relevancy of the decryption is a predictive measure of whether a Server Name Identifier (SNI) included in an encrypted content in the encrypted QUIC initial handshake packet would match with one or more pre-stored signatures, when decrypted. The pre-stored UE context parameters may include at least one of a UE Internet Protocol (IP) address, total number of QUIC data packet flows related to the UE in a first predefined time, total number of useful QUIC data packet flows among the total number of QUIC data packet flows related to the UE in the first predefined time and a QUIC Usefulness Indicator (QUI) value indicating usefulness of the QUIC data packet flow 109 for Deep Packet Inspection (DPI) application detection. The processor 303 determines the QUI value based on number of QUIC data packet flows 109 of a specific application for a UE in a current time cycle, total number of the QUIC data packet flows 109 identified for the specific application in the current time cycle and probability of receiving a new QUIC data packet flow 109 for the specific application. The pre-stored server context parameters may include at least one of a server Internet Protocol (IP) address, total number of QUIC data packet flows related to the server in a second predefined time and total number of useful QUIC data packet flows among the total number of QUIC data packet flows related to the server in the second predefined time. The pre-stored UE context parameters and the pre-stored server context parameters are updated upon receiving each QUIC data packet flow 109 and at predefined time intervals. The processor 303 may extract the flow context parameters from the QUIC data packet flow 109 received from the source. The flow context parameters may include one or more packet features comprising at least one of a server Internet Protocol (IP) address, server port number, UE IP address, UE port number and packet bytes in the encrypted QUIC initial handshake packet. The processor 303 forwards the QUIC data packet flow 109 to one or more processing engines 107, without decrypting, for performing one or more operations when the relevancy of the decryption is predicted to be not useful. Further, the processor 303 updates the pre-stored UE context parameters, and the pre-stored server context parameters upon forwarding the QUIC data packet flow 109

At block 505, the method 500 includes decrypting, by the processor 303, the encrypted QUIC initial handshake packet when the relevancy of the decryption is predicted to be useful. The processor 303 decrypts the SNI from an encrypted content in the encrypted QUIC initial handshake packet. Further, the processor 303 verifies correctness of the prediction related to the relevancy of the decryption based on a comparison of a Server Name Identifier (SNI) with one or more pre-stored signatures. The processor 303 updates the pre-stored UE context parameters, and the pre-stored server context parameters based on the verification.

Figure 6:
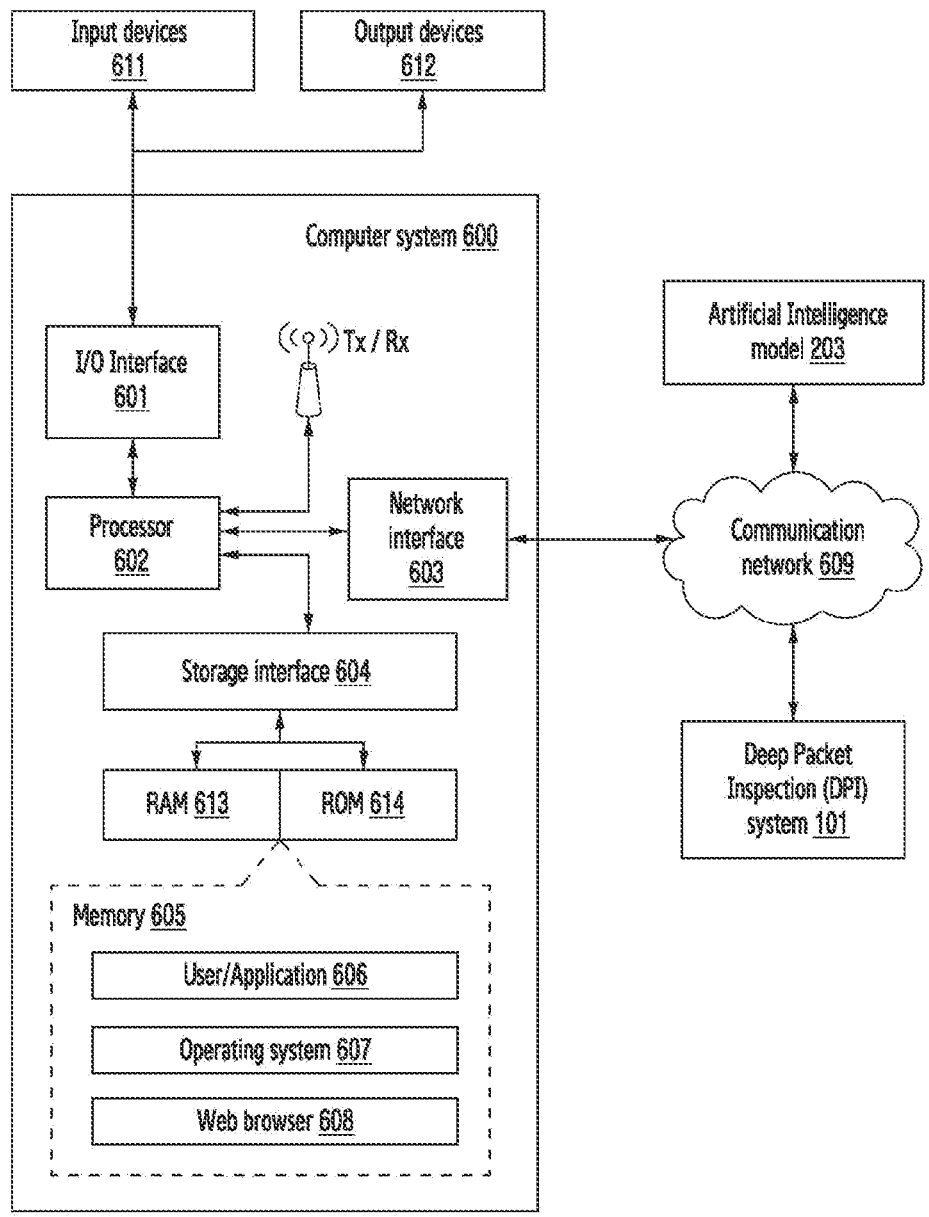
FIG. 6 is a block diagram illustrating an example configuration of a computer system according to various embodiments.

FIG. 6 is a block diagram illustrating an example configuration of a computer system for implementing various embodiments. In an embodiment, the computer system 600 may be the decrypting system 202 illustrated in FIG. 2A. The computer system 600 may include a central processing unit ("CPU" or "processor" or "memory controller") 602. The processor (e.g., including processing circuitry) 602 may comprise at least one data processor for executing program components for executing user- or system-generated business processes. A user may include a network manager, an application developer, a programmer, an organization or any system/sub-system being operated parallelly to the computer system 600. The processor 602 may include specialized processing units such as integrated system (bus) controllers, memory controllers/memory management control units, floating point units, graphics processing units, digital signal processing units, etc. The processor 602 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor may be disposed in communication with one or more Input/Output (I/O) devices (611 and 612) via I/O interface 601, each of which may include various circuitry. The I/O interface 601 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 601, the computer system 600 may communicate with one or more I/O devices 611 and 612.

In various embodiments, the processor 602 may be disposed in communication with a network 609 via a network interface 603. The network interface 603 may communicate with the network 609. The network interface 603 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc.

In an implementation, the network 609 may be implemented as one of the several types of networks, such as intranet or Local Area Network (LAN) and such within the organization. The network 609 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP) etc., to communicate with each other. Further, the network 609 may include a variety of network devices, including routers, bridges, servers, computing devices, storage devices, etc. Using the network interface 603 and the network 609, the computer system 600 may communicate with a Deep Packet Inspection (DPI) system 101 and Artificial Intelligence (AI) model 203.

In various embodiments, the processor 602 may be disposed in communication with a memory 605 (e.g., RAM 613, ROM 614, etc. as shown in FIG. 6) via a storage interface 604. The storage interface 604 may connect to memory 605 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user/application interface 606, an operating system 607, a web browser 608, and the like. In various embodiments, computer system 600 may store user/application data 606, such as the data, variables, records, etc. as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 606 may facilitate display, execution, interaction, manipulation, or operation of program components through textual or graphical facilities. For example, the user interface 606 may provide computer interaction interface elements on a display system operatively connected to the computer system 600, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Acro, Metro, etc.), web interface libraries (e.g., ActiveX®, JAVA®, JAVASCRIPT®), AJAX, HTML, ADOBE® FLASH®, etc.), or the like.

The web browser 608 may be a hypertext viewing application. Secure web browsing may be provided using Secure Hypertext Transport Protocol (HTTPS), Secure Sockets Layer (SSL), Transport Layer Security (TLS), and the like. The web browsers 608 may utilize facilities such as AJAX, DHTML, ADOBE® FLASH®, JAVASCRIPT®, JAVA®, Application Programming Interfaces (APIs), and the like. Further, the computer system 600 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In various embodiments, the computer system 600 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more non-transitory computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with various embodiments described herein. The term "computer-readable medium" may be understood to include tangible items and exclude carrier waves and transient signals, e.g., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The disclosed method may predict the relevancy of decryption using the AI model and then decrypts the encrypted QUIC data packet flow, which avoids the need to decrypt every QUIC data packet flow received by the DPI system. This helps to improve the DPI throughput and optimal usage of CPU resources. As the total CPU consumption due to decryption is substantially reduced, CPU resources can be available and allocated for different tasks.

The disclosed method may use pre-stored UE context parameters, pre-stored server context parameters and flow context parameters of the encrypted QUIC data packet flow to predict the relevancy of decryption. This helps the AI model to predict based on real-time values, which ensures accurate prediction based on the real-time information. Specifically, the pre-stored UE context parameters indicate the recently used applications by the UE which helps to predict the relevancy as the upcoming encrypted QUIC data packet flow may be related to the application currently used in the UE.

The disclosed method may verify the prediction performed by the AI model which helps to enhance the accuracy of the AI model. For example, the disclosed method randomly verifies the predictions made by the AI model by decrypting QUIC data packet flow and matching the SNI with the one or more pre-stored signatures.

As stated above, it shall be noted that the method of the present disclosure may be used to address various technical problems related to network traffic management. In other words, the disclosed method has a practical application and provides a technically advanced solution to the technical problems associated with the existing approach into assessing performance of a plurality of outlets.

According to embodiments, a method of network traffic management may comprise receiving, by a network entity, an encrypted Quick User Datagram Protocol (UDP) Internet Connection (QUIC) data packet flow from a source. The method may comprise predicting using an Artificial Intelligence (AI) model, by the network entity, a relevancy of decryption for an encrypted QUIC initial handshake packet of the QUIC data packet flow based on at least one of stored User Equipment (UE) context parameters, stored server context parameters and flow context parameters of the encrypted QUIC data packet flow. The method may comprise decrypting, by the network entity, the encrypted QUIC initial handshake packet based on the relevancy of the decryption being predicted to be useful.

In an embodiment, wherein the stored UE context parameters may comprise at least one of a UE Internet Protocol (IP) address, total number of QUIC data packet flows related to the UE in a first specified time, total number of useful QUIC data packet flows among the total number of QUIC data packet flows related to the UE in the first specified time and a QUIC Usefulness Indicator (QUI) value indicating usefulness of the QUIC data packet flow for Deep Packet Inspection (DPI) application detection.

In an embodiment, the QUI value may be determined based on number of QUIC data packet flows of a specific application for a UE in a current time cycle, total number of the QUIC data packet flows identified for the specific application in the current time cycle and probability of receiving a new QUIC data packet flow for the specific application.

In an embodiment, the stored server context parameters may comprise at least one of a server Internet Protocol (IP) address, total number of QUIC data packet flows related to the server in a second specified time and total number of useful QUIC data packet flows among the total number of QUIC data packet flows related to the server in the second specified time.

In an embodiment, the stored UE context parameters and the pre-stored server context parameters may be updated upon receiving each QUIC data packet flow and at specified time intervals.

In an embodiment, the flow context parameters may bee extracted from the QUIC data packet flow received from the source, wherein the flow context parameters comprise one or more packet features comprising at least one of a server Internet Protocol (IP) address, server port number, UE IP address, UE port number and packet bytes in the encrypted QUIC initial handshake packet.

In an embodiment, wherein the decrypting the encrypted QUIC initial handshake packet may comprise decrypting a Server Name Identifier (SNI) from an encrypted content in the encrypted QUIC initial handshake packet.

In an embodiment, the method may further comprise verifying, by the network entity, correctness of the prediction related to the relevancy of the decryption based on a comparison of a Server Name Identifier (SNI) with one or more stored signatures. The method may further comprise updating, by the network entity, the stored UE context parameters, and the stored server context parameters based on the verification.

In an embodiment, the method may further comprise forwarding, by the network entity, the QUIC data packet flow to one or more processing engines, without decrypting, for performing one or more operations based on the relevancy of the decryption being predicted to be not useful. The method may further comprise updating, by the network entity, the stored UE context parameters, and the stored server context parameters upon forwarding the QUIC data packet flow.

In an embodiment, the source may comprise at least one of a UE and a server.

In an embodiment, the encrypted QUIC initial handshake packet may be a first packet in the QUIC data packet flow used to establish a connection.

In an embodiment, the relevancy of the decryption may be a predictive measure of whether a Server Name Identifier (SNI) included in an encrypted content in the encrypted QUIC initial handshake packet would match with one or more pre-stored signatures, when decrypted.

According to embodiments, a network entity for network traffic management, the decrypting system may comprise at least one processor comprising processing circuitry. The decrypting system may comprise a memory, communicatively coupled to at least one processor, wherein the memory stores executable instructions. The at least one processor, individually and/or collectively, may be configured to receive an encrypted Quick User Datagram Protocol (UDP) Internet Connection (QUIC) data packet flow from a source. The at least one processor, individually and/or collectively, may be configured to predict using an Artificial Intelligence (AI) model a relevancy of decryption for an encrypted QUIC initial handshake packet of the QUIC data packet flow based on at least one of stored User Equipment (UE) context parameters, stored server context parameters and flow context parameters of the encrypted QUIC data packet flow. The at least one processor, individually and/or collectively, may be configured to decrypt the encrypted QUIC initial handshake packet based on the relevancy of the decryption being predicted to be useful.

In an embodiment, to decrypt the encrypted QUIC initial handshake packet, the at least on processor, individually and/or collectively, may be configured to decrypt a Server Name Identifier (SNI) from an encrypted content in the encrypted QUIC initial handshake packet.

In an embodiment, the at least one processor, individually and/or collectively, may be configured to verify correctness of the prediction related to the relevancy of the decryption based on a comparison of a Server Name Identifier (SNI) with one or more stored signatures. The at least one processor, individually and/or collectively, may be configured to update the stored UE context parameters, and the stored server context parameters based on the verification.

In an embodiment, the at least one processor, individually and/or collectively, mat be configured to forward the QUIC data packet flow to one or more processing engines, without decrypting, for performing one or more operations based on the relevancy of the decryption being predicted to be not useful. The at least one processor, individually and/or collectively, mat be configured to update the stored UE context parameters, and the stored server context parameters upon forwarding the QUIC data packet flow.

In an embodiment, the relevancy of the decryption may be a predictive measure of whether a Server Name Identifier (SNI) included in an encrypted content in the encrypted QUIC initial handshake packet would match with one or more stored signatures, when decrypted.

According to embodiments, a method performed by a network entity for network traffic management may comprises receiving an encrypted Quick User Datagram Protocol (UDP) Internet Connection (QUIC) data packet flow from a source. The method may comprise predicting using an Artificial Intelligence (AI) model, whether a server name identifier (SNI) in an encrypted QUIC initial handshake packet of the QUIC data packet flow is matched with one or more stored signatures based on at least one of stored User Equipment (UE) context parameters, stored server context parameters and flow context parameters of the encrypted QUIC data packet flow. The method may comprise decrypting the encrypted QUIC initial handshake packet based on predicting that the SNI is matched with the one or more stored signatures.

In an embodiment, the stored UE context parameters may comprise at least one of a UE Internet Protocol (IP) address, total number of QUIC data packet flows related to the UE in a first specified time, total number of useful QUIC data packet flows among the total number of QUIC data packet flows related to the UE in the first specified time and a QUIC Usefulness Indicator (QUI) value indicating usefulness of the QUIC data packet flow for Deep Packet Inspection (DPI) application detection.

In an embodiment, the QUI value may be determined based on number of QUIC data packet flows of a specific application for a UE in a current time cycle, total number of the QUIC data packet flows identified for the specific application in the current time cycle and probability of receiving a new QUIC data packet flow for the specific application.

In an embodiment, the stored server context parameters may comprise at least one of a server Internet Protocol (IP) address, total number of QUIC data packet flows related to the server in a second specified time and total number of useful QUIC data packet flows among the total number of QUIC data packet flows related to the server in the second specified time.

In an embodiment, the stored UE context parameters and the stored server context parameters may be updated upon receiving each QUIC data packet flow and at specified time intervals.

In an embodiment, the flow context parameters may be extracted from the QUIC data packet flow received from the source, wherein the flow context parameters comprise one or more packet features comprising at least one of a server Internet Protocol (IP) address, server port number, UE IP address, UE port number and packet bytes in the encrypted QUIC initial handshake packet.

In an embodiment, the decrypting the encrypted QUIC initial handshake packet may comprise decrypting the SNI from an encrypted content in the encrypted QUIC initial handshake packet.

In an embodiment, the method may further comprise verifying correctness of the prediction related to a relevancy of the decryption based on a comparison of the SNI with the one or more stored signatures. The method may further comprise updating the stored UE context parameters, and the stored server context parameters based on the verification.

In an embodiment, the method may further comprise forwarding the QUIC data packet flow to one or more processing engines, without decrypting, for performing one or more operations based on predicting that the SNI is not matched with the one or more stored signatures. The method may further comprise updating the stored UE context parameters, and the stored server context parameters upon forwarding the QUIC data packet flow.

In an embodiment, the source may comprise at least one of a UE and a server.

In an embodiment, the encrypted QUIC initial handshake packet may be a first packet in the QUIC data packet flow used to establish a connection.

According to embodiments, a network entity for network traffic management, may comprise at least one processor comprising processing circuitry. The network entity may comprise a memory storing instructions. The instructions, executed by the at least one processor individually or collectively, may cause the network entity to receive an encrypted Quick User Datagram Protocol (UDP) Internet Connection (QUIC) data packet flow from a source. The instructions, executed by the at least one processor individually or collectively, may cause the network entity to predict using an Artificial Intelligence (AI) model whether a sever name identifier (SNI) in an encrypted QUIC initial handshake packet of the QUIC data packet flow is matched with one or more stored signatures based on at least one of stored User Equipment (UE) context parameters, stored server context parameters and flow context parameters of the encrypted QUIC data packet flow. The instructions, executed by the at least one processor individually or collectively, may cause the network entity to decrypt the encrypted QUIC initial handshake packet based on predicting that the SNI is matched with the one or more stored signatures.

In an embodiment, the instructions, executed by the at least one processor individually or collectively, may cause the network entity to decrypt the SNI from an encrypted content in the encrypted QUIC initial handshake packet.

In an embodiment, the instructions, executed by the at least one processor individually or collectively, may cause the network entity to verify correctness of the prediction related to a relevancy of the decryption based on a comparison of the SNI with the one or more stored signatures. The instructions, executed by the at least one processor individually or collectively, may cause the network entity to update the stored UE context parameters, and the stored server context parameters based on the verification.

In an embodiment, the instructions, executed by the at least one processor individually or collectively, may cause the network entity to forward the QUIC data packet flow to one or more processing engines, without decrypting, for performing one or more operations based on predicting that the SNI is not matched with the one or more stored signatures. The instructions, executed by the at least one processor individually or collectively, may cause the network entity to update the stored UE context parameters, and the stored server context parameters upon forwarding the QUIC data packet flow.

In an embodiment, the stored UE context parameters may comprise at least one of a UE Internet Protocol (IP) address, total number of QUIC data packet flows related to the UE in a first specified time, total number of useful QUIC data packet flows among the total number of QUIC data packet flows related to the UE in the first specified time and a QUIC Usefulness Indicator (QUI) value indicating usefulness of the QUIC data packet flow for Deep Packet Inspection (DPI) application detection.

In an embodiment, the QUI value may be determined based on number of QUIC data packet flows of a specific application for a UE in a current time cycle, total number of the QUIC data packet flows identified for the specific application in the current time cycle and probability of receiving a new QUIC data packet flow for the specific application.

In an embodiment, the stored server context parameters may comprise at least one of a server Internet Protocol (IP) address, total number of QUIC data packet flows related to the server in a second specified time and total number of useful QUIC data packet flows among the total number of QUIC data packet flows related to the server in the second specified time.

In an embodiment, the flow context parameters may be extracted from the QUIC data packet flow received from the source, wherein the flow context parameters comprise one or more packet features comprising at least one of a server Internet Protocol (IP) address, server port number, UE IP address, UE port number and packet bytes in the encrypted QUIC initial handshake packet.

According to embodiments, a non-transitory computer-readable storage medium, when executed by at least one processor of a network entity, may store one or more programs including instructions that cause to receive an encrypted Quick User Datagram Protocol (UDP) Internet Connection (QUIC) data packet flow from a source. The non-transitory computer-readable storage medium when executed by the at least one processor individually or collectively of the network entity, may store one or more programs including instructions that cause to predict using an Artificial Intelligence (AI) model whether a sever name identifier (SNI) in an encrypted QUIC initial handshake packet of the QUIC data packet flow is matched with one or more stored signatures based on at least one of stored User Equipment (UE) context parameters, stored server context parameters and flow context parameters of the encrypted QUIC data packet flow. The non-transitory computer-readable storage medium when executed by the at least one processor individually or collectively of the network entity, may store one or more programs including instructions that cause to decrypt the encrypted QUIC initial handshake packet based on predicting that the SNI is matched with the one or more stored signatures.

In light of the technical advancements provided by the disclosed method, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" may refer to "one or more (but not all) embodiments of the disclosure" unless expressly specified otherwise.

The terms "including", "comprising", "having" and variations thereof may refer to "including but not limited to", unless expressly specified otherwise.

The enumerated listing of items does not imply that any or all the items are mutually exclusive, unless expressly specified otherwise. The terms "a", "an" and "the" may refer to "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/ features. Thus, other embodiments of disclosure need not include the device itself.

The language used in the disclosure has been selected for readability and instructional purposes, and it may not have been selected to delineate or circumscribe the disclosed subject matter. It is therefore intended that the scope of the disclosure not be limited not by this detailed description. Accordingly, the various example embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being included in the following claims. It will also be understood that any of the embodiment(s) described herein may be used in conjunction with any other embodiment(s) described herein.

What is claimed is:

1. A method performed by a network entity for network traffic management, the method comprising:
    receiving an encrypted Quick User Datagram Protocol (UDP) Internet Connection (QUIC) data packet flow from a source;
    predicting using an Artificial Intelligence (AI) model, whether a server name identifier (SNI) in an encrypted QUIC initial handshake packet of the QUIC data packet flow is matched with one or more stored signatures based on at least one of stored User Equipment (UE) context parameters, stored server context parameters and flow context parameters of the encrypted QUIC data packet flow; and
    decrypting the encrypted QUIC initial handshake packet based on predicting that the SNI is matched with the one or more stored signatures.

2. The method as claimed in claim 1, wherein the stored UE context parameters comprise at least one of a UE Internet Protocol (IP) address, total number of QUIC data packet flows related to the UE in a first specified time, total number of useful QUIC data packet flows among the total number of QUIC data packet flows related to the UE in the first specified time and a QUIC Usefulness Indicator (QUI) value indicating usefulness of the QUIC data packet flow for Deep Packet Inspection (DPI) application detection.

3. The method as claimed in claim 2, wherein the QUI value is determined based on number of QUIC data packet flows of a specific application for a UE in a current time cycle, total number of the QUIC data packet flows identified for the specific application in the current time cycle and probability of receiving a new QUIC data packet flow for the specific application.

4. The method as claimed in claim 1, wherein the stored server context parameters comprise at least one of a server Internet Protocol (IP) address, total number of QUIC data packet flows related to the server in a second specified time and total number of useful QUIC data packet flows among the total number of QUIC data packet flows related to the server in the second specified time.

5. The method as claimed in claim 1, wherein the stored UE context parameters and the stored server context parameters are updated upon receiving each QUIC data packet flow and at specified time intervals.

6. The method as claimed in claim 1, wherein the flow context parameters are extracted from the QUIC data packet flow received from the source, wherein the flow context parameters comprise one or more packet features comprising at least one of a server Internet Protocol (IP) address, server port number, UE IP address, UE port number and packet bytes in the encrypted QUIC initial handshake packet.

7. The method as claimed in claim 1, wherein decrypting the encrypted QUIC initial handshake packet comprises:
    decrypting the SNI from an encrypted content in the encrypted QUIC initial handshake packet.

8. The method as claimed in claim 1, further comprising:
    verifying correctness of the prediction related to a relevancy of the decryption based on a comparison of the SNI with the one or more stored signatures; and
    updating the stored UE context parameters, and the stored server context parameters based on the verification.

9. The method as claimed in claim 1, further comprising:
forwarding the QUIC data packet flow to one or more processing engines, without decrypting, for performing one or more operations based on predicting that the SNI is not matched with the one or more stored signatures; and updating the stored UE context parameters, and the stored server context parameters upon forwarding the QUIC data packet flow.

10. The method as claimed in claim 1, wherein the source comprises at least one of a UE and a server.

11. The method as claimed in claim 1, wherein the encrypted QUIC initial handshake packet is a first packet in the QUIC data packet flow used to establish a connection.

12. A network entity for network traffic management, comprising:
at least one processor comprising processing circuitry; and
a memory storing instructions,
wherein the instructions, executed by the at least one processor individually or collectively, cause the network entity to:
receive an encrypted Quick User Datagram Protocol (UDP) Internet Connection (QUIC) data packet flow from a source;
predict using an Artificial Intelligence (AI) model whether a sever name identifier (SNI) in an encrypted QUIC initial handshake packet of the QUIC data packet flow is matched with one or more stored signatures based on at least one of stored User Equipment (UE) context parameters, stored server context parameters and flow context parameters of the encrypted QUIC data packet flow; and
decrypt the encrypted QUIC initial handshake packet based on predicting that the SNI is matched with the one or more stored signatures.

13. The network entity as claimed in claim 12, wherein the instructions, executed by the at least one processor individually or collectively, cause the network entity to:
decrypt the SNI from an encrypted content in the encrypted QUIC initial handshake packet.

14. The network entity as claimed in claim 12, wherein the instructions, executed by the at least one processor individually or collectively, cause the network entity to:
verify correctness of the prediction related to a relevancy of the decryption based on a comparison of the SNI with the one or more stored signatures; and
update the stored UE context parameters, and the stored server context parameters based on the verification.

15. The network entity as claimed in claim 12, wherein the instructions, executed by the at least one processor individually or collectively, cause the network entity to:
forward the QUIC data packet flow to one or more processing engines, without decrypting, for performing one or more operations based on predicting that the SNI is not matched with the one or more stored signatures; and
update the stored UE context parameters, and the stored server context parameters upon forwarding the QUIC data packet flow.

16. The network entity as claimed in claim 12, wherein the stored UE context parameters comprise at least one of a UE Internet Protocol (IP) address, total number of QUIC data packet flows related to the UE in a first specified time, total number of useful QUIC data packet flows among the total number of QUIC data packet flows related to the UE in the first specified time and a QUIC Usefulness Indicator (QUI) value indicating usefulness of the QUIC data packet flow for Deep Packet Inspection (DPI) application detection.

17. The network entity as claimed in claim 16, wherein the QUI value is determined based on number of QUIC data packet flows of a specific application for a UE in a current time cycle, total number of the QUIC data packet flows identified for the specific application in the current time cycle and probability of receiving a new QUIC data packet flow for the specific application.

18. The network entity as claimed in claim 12, wherein the stored server context parameters comprise at least one of a server Internet Protocol (IP) address, total number of QUIC data packet flows related to the server in a second specified time and total number of useful QUIC data packet flows among the total number of QUIC data packet flows related to the server in the second specified time.

19. The network entity as claimed in claim 12, wherein the flow context parameters are extracted from the QUIC data packet flow received from the source, wherein the flow context parameters comprise one or more packet features comprising at least one of a server Internet Protocol (IP) address, server port number, UE IP address, UE port number and packet bytes in the encrypted QUIC initial handshake packet.

20. A non-transitory computer-readable storage medium, when executed by at least one processor of a network entity, stores one or more programs including instructions that cause to:
receive an encrypted Quick User Datagram Protocol (UDP) Internet Connection (QUIC) data packet flow from a source;
predict using an Artificial Intelligence (AI) model whether a sever name identifier (SNI) in an encrypted QUIC initial handshake packet of the QUIC data packet flow is matched with one or more stored signatures based on at least one of stored User Equipment (UE) context parameters, stored server context parameters and flow context parameters of the encrypted QUIC data packet flow; and
decrypt the encrypted QUIC initial handshake packet based on predicting that the SNI is matched with the one or more stored signatures.

* * * * *